United States Patent
Zhang et al.

(10) Patent No.: US 10,164,960 B2
(45) Date of Patent: Dec. 25, 2018

(54) METHOD FOR CUSTOMIZING CONTROLLED SMARTPHONE

(71) Applicant: GREEN NET WORLD (FUJIAN) NETWORK TECHNOLOGY CO., LTD., Xiamen (CN)

(72) Inventors: Xicong Zhang, Xiamen (CN); Longbin Wu, Xiamen (CN)

(73) Assignee: GREEN NET WORLD (FUJIAN) NETWORK TECHNOLOGY CO., LTD., Xiamen, Fujian (CN)

(*) Notice: Subject to any disclaimer, the term of this patent is extended or adjusted under 35 U.S.C. 154(b) by 118 days.

(21) Appl. No.: 15/487,439

(22) Filed: Apr. 14, 2017

(65) Prior Publication Data

US 2018/0019989 A1    Jan. 18, 2018

(30) Foreign Application Priority Data

Jul. 15, 2016  (CN) .......................... 2016 1 0557535

(51) Int. Cl.
| | |
|---|---|
| *H04L 29/06* | (2006.01) |
| *H04W 4/50* | (2018.01) |
| *G06F 8/61* | (2018.01) |
| *H04W 4/12* | (2009.01) |
| *H04W 12/06* | (2009.01) |
| *H04W 12/08* | (2009.01) |

(52) U.S. Cl.
CPC ................ *H04L 63/08* (2013.01); *G06F 8/61* (2013.01); *H04L 63/101* (2013.01); *H04W 4/12* (2013.01); *H04W 4/50* (2018.02); *H04W 12/06* (2013.01); *H04W 12/08* (2013.01)

(58) Field of Classification Search
CPC .......... H04L 63/08; G06F 8/61; H04W 12/06; H04W 12/08; H04W 4/12; H04W 4/50
See application file for complete search history.

(56) References Cited

U.S. PATENT DOCUMENTS

2008/0146211 A1* 6/2008 Mikan ................. H04M 3/2218
455/419

* cited by examiner

*Primary Examiner* — Jeffrey C Pwu
*Assistant Examiner* — Thong P Truong
(74) *Attorney, Agent, or Firm* — Leong C. Lei

(57) ABSTRACT

A method for customizing a controlled smartphone involves downloading a source code and relevant development tool for Android 5.1, compiling a ROM package to produce a version of ROM having the master APP, flashing the smartphone with the ROM, creating states of "Deactivated" and "Activated" for the smartphone's various functions, and whitelisting the master APP for APP installation authentication, incoming/outgoing number authentication, and short text message authentication, thereby achieving control over adolescents' web surfing times and hours, visited websites, used application programs and received messages.

1 Claim, No Drawings

METHOD FOR CUSTOMIZING CONTROLLED SMARTPHONE

BACKGROUND OF THE INVENTION

1. Technical Field

The present invention relates to a method for customizing a controlled smartphone.

2. Description of Related Art

With the rapid development of communication technology, smartphones have become indispensable in modern people's daily life. As a result of the increasingly growth of the mobile internet, the relevance between wireless application and smartphones is significantly enhanced, and more and more application programs become available on smartphones. In response to the fast developing mobile internet application, personalized smartphones have been introduced for the beneficial capability of customization that meets diverse needs of customers from different industries.

However, the all-time convenience of web surfing makes many adolescents wallow in the cyber world and online games. If our young students play online games, chat online, and browse websites in class, it is very likely the academic environment and the students' academic performance are ruined. Thus, there is a need for controlled smartphones, which allow control over adolescents' web surfing times and hours, visited websites, used application programs and received messages.

SUMMARY OF THE INVENTION

The primary objective of the present invention is to provide a method for customizing a controlled smartphone. With this method, a smartphone can be customized to provide control over adolescents' web surfing times and hours, visited websites, used application programs and received messages.

A method for customizing a controlled smartphone according to the present invention comprises the following steps:

Step 1, downloading a source code and a development tool relevant to Android 5.1 System (hereinafter the "operating system"), using the development tool to call for a system signature for performing system signature on a middleware, placing an installation package of a master APP into a directory SYSTEM/APP of the source code, granting permission to the master APP, compiling a ROM package to produce a version of ROM having the master APP, and using the ROM to flash a smartphone compatible with the source code of the operating system;

Step 2, creating states of "Deactivated" and "Activated" for the smartphone's Bluetooth function, WIFI function, data network, airplane mode, VPN function, APN function, SIM card, camera, answering machine, and USB ports, so that when any of these items is in the "deactivated" state, an "On/Off" button associated with a function module of this affected item is forcedly greyed out and not operable, and only when in the "activated" state, the "On/Off" button become operable;

Step 3, for preventing the master APP from uninstallation, forcedly greying out buttons named as "All", "Cached", and "Running" in "APP Management" under "System Configuration"; and forcedly greying out greying out buttons named as "Stop Anyway", "Uninstallation", "Erase Data", "Clean Cache" in "APP Details" under "Settings" for "APP Management" under "System Configuration";

for preventing the master APP from being stopped when working, where any packages of Killpackage and Forcepackage methods to be run by the operating system are named with the master APP's name, ignoring the package(s);

deactivating root permission in the operating system;

for preventing ROM flashing, greying out USB ports and ADB Driver;

for preventing the customized smartphone from being restored with factory settings, forcedly greying out buttons named as "System Update" and "Restore Factory Settings" in "System Configuration"; and for preventing data erasing and cache cleaning in Mode Recovery, deactivating in the operating system a function of the smartphone that is otherwise activated by pressing buttons "Volume down" and "Power" simultaneously;

Step 4, preloading plural application programs in the smartphone, including an APP control table that contains installation package names and relevant states of all application programs preinstalled in the controlled smartphone, and categorizes each said application program as "activated" or "deactivated", wherein in an initial stage, icons of all the application programs are displayed in a desktop of the smartphone and all the installation package names in the APP control table are in the activated state;

Step 5, greying out the smartphone's HOME button, pressing and holding the smartphone's HOME button and Back button, and greying out the smartphone's status bar; and Step 6, configuring an authentication module in the ROM, and whitelisting the master APP for APP installation authentication, incoming/outgoing number authentication, and short text message authentication, which means that before an application program is to be installed in the smartphone, its package name is sent to the master APP for authentication, and only when it is authenticated by the master APP, the system allows the application program to be installed, and similarly, numbers of calls received or made by the smartphone are subject to the master APP's authentication, and only the number(s) authenticated by the master APP can be activated in the smartphone by means of ringing or an outgoing call, while the number(s) failing in said authentication is intercepted and logged in a call record of the smartphone; and when the smartphone receives an incoming short text message, the operating system, instead of inserting the short text message into its message database, produces a record for the master APP's authentication, wherein the record contains: related to the short text message, a sender's number, a recipient's number, a state mark indicating the receipt, and the short text message's content, and only when the short text message is authenticated by the master APP, it is inserted into the system's message database and renders a message icon into an unread state; otherwise, the master APP directs the system to discard this short text message, and when a short text message has been draft in the smartphone for sending out, upon a Send button is pressed, the system, instead of directly sending out the short text message, produces a record for the master APP's authentication, wherein the record contains: related to the short text message, a sender's number, a recipient's number, a state mark indicating the sending, and the short text message's content, and only when the short text message is authenticated by the master APP, the master APP directs the system to send out the short text message; otherwise, the master APP directs the system not to send out the short text message, and informing a user that this short text message is prevented from going out.

In the present invention, a method for customizing a controlled smartphone involves downloading a source code and relevant development tool for Android 5.1, compiling a ROM package to produce a version of ROM having the master APP, flashing the smartphone with the ROM, creating states of "Deactivated" and "Activated" for the smartphone's various functions, forcedly greying out "On/Off" buttons for function modules, making settings on the smartphone for preventing the master APP from being uninstallation, stop, and flashing, configuring authentication modules in the ROM version, and whitelisting the master APP for APP installation authentication, incoming/outgoing number authentication, and short text message authentication. The smartphone customized using the disclosed method allows control over adolescents' web surfing times and hours, visited websites, used application programs and received messages.

DETAILED DESCRIPTION OF THE INVENTION

In one embodiment of the present invention, an NEXUS smartphone with Android 5.1 is customized. It is to be noted that the smartphone to be customized using the disclosed method must be compatible with the operating system to be installed in terms of source code.

The method for customizing a controlled smartphone of the present invention comprises the following steps:

Step 1, downloading a source code and a development tool relevant to Android 5.1 System (hereinafter the "operating system"), using the development tool to call for a system signature for performing system signature on a middleware, placing an installation package of a master APP (APK) into a directory SYSTEM/APP of the source code, granting permission to the master APP, compiling a ROM package to produce a version of ROM having the master APP, and using the ROM to flash an NEXUS smartphone;

Step 2, creating states of "Deactivated" and "Activated" for the smartphone's Bluetooth function, WIFI function, data network, airplane mode, VPN function, APN function, SIM card, camera, answering machine, and USB ports, so that when any of these items is in the "deactivated" state, an "On/Off" button associated with a function module of this affected item is forcedly greyed out and not operable, and only when in the "activated" state, the "On/Off" button become operable;

Step 3, for preventing the master APP from uninstallation, forcedly greying out buttons named as "All", "Cached", and "Running" in "APP Management" under "System Configuration"; and forcedly greying out greying out buttons named as "Stop Anyway", "Uninstallation", "Erase Data", "Clean Cache" in "APP Details" under "Settings" for "APP Management" under "System Configuration";

for preventing the master APP from being stopped when working, where any packages of Killpackage and Forcepackage methods to be run by the operating system are named with the master APP's name, ignoring the package(s);

deactivating root permission in the operating system;

for preventing ROM flashing, greying out USB ports and ADB Driver;

for preventing the customized smartphone from being restored with factory settings, forcedly greying out buttons named as "System Update" and "Restore Factory Settings" in "System Configuration"; and for preventing data erasing and cache cleaning in Mode Recovery, deactivating in the operating system a function of the smartphone that is otherwise activated by pressing buttons "Volume down" and "Power" simultaneously;

Step 4, preloading plural application programs in the smartphone, including an APP control table that contains installation package names and relevant states of all application programs preinstalled in the controlled smartphone, and categorizes each said application program as "activated" or "deactivated", wherein in an initial stage, icons of all the application programs are displayed in a desktop of the smartphone and all the installation package names in the APP control table are in the activated state;

Step 5, greying out the smartphone's HOME button, pressing and holding the smartphone's HOME button and Back button, and greying out the smartphone's status bar; and Step 6, configuring an authentication module in the ROM, and whitelisting the master APP for APP installation authentication, incoming/outgoing number authentication, and short text message authentication, which means that before an application program is to be installed in the smartphone, its package name is sent to the master APP for authentication, and only when it is authenticated by the master APP, the system allows the application program to be installed, and similarly, numbers of calls received or made by the smartphone are subject to the master APP's authentication, and only the number(s) authenticated by the master APP can be activated in the smartphone by means of ringing or an outgoing call, while the number(s) failing in said authentication is intercepted and logged in a call record of the smartphone; and when the smartphone receives an incoming short text message, the operating system, instead of inserting the short text message into its message database, produces a record for the master APP's authentication, wherein the record contains: related to the short text message, a sender's number, a recipient's number, a state mark indicating the receipt, and the short text message's content, and only when the short text message is authenticated by the master APP, it is inserted into the system's message database and renders a message icon into an unread state; otherwise, the master APP directs the system to discard this short text message, and when a short text message has been draft in the smartphone for sending out, upon a Send button is pressed, the system, instead of directly sending out the short text message, produces a record for the master APP's authentication, wherein the record contains: related to the short text message, a sender's number, a recipient's number, a state mark indicating the sending, and the short text message's content, and only when the short text message is authenticated by the master APP, the master APP directs the system to send out the short text message; otherwise, the master APP directs the system not to send out the short text message, and informing a user that this short text message is prevented from going out.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for customizing a controlled smartphone, being characterized in comprising the following steps:

Step 1, downloading a source code and a development tool relevant to Android 5.1 System (hereinafter the "operating system"), using the development tool to call for a system signature for performing system signature on a middleware, placing an installation package of a master APP into a directory SYSTEM/APP of the source code, granting permission to the master APP, compiling a ROM package to produce a version of ROM having the master APP, and using the ROM to flash a smartphone compatible with the source code of the operating system;

Step 2, creating states of "Deactivated" and "Activated" for the smartphone's Bluetooth function, WIFI function, data network, airplane mode, VPN function, APN function, SIM card, camera, answering machine, and USB ports, so that when any of these items is in the "deactivated" state, an "On/Off" button associated with a function module of this affected item is forcedly greyed out and not operable, and only when in the "activated" state, the "On/Off" button become operable;

Step 3, for preventing the master APP from uninstallation, forcedly greying out buttons named as "All", "Cached", and "Running" in "APP Management" under "System Configuration"; and forcedly greying out greying out buttons named as "Stop Anyway", "Uninstallation", "Erase Data", "Clean Cache" in "APP Details" under "Settings" for "APP Management" under "System Configuration";

for preventing the master APP from being stopped when working, where any packages of Killpackage and Forcepackage methods to be run by the operating system are named with the master APP's name, ignoring the package(s);

deactivating root permission in the operating system;

for preventing ROM flashing, greying out USB ports and ADB Driver;

for preventing the customized smartphone from being restored with factory settings, forcedly greying out buttons named as "System Update" and "Restore Factory Settings" in "System Configuration"; and for preventing data erasing and cache cleaning in Mode Recovery, deactivating in the operating system a function of the smartphone that is otherwise activated by pressing buttons "Volume down" and "Power" simultaneously;

Step 4, preloading plural application programs in the smartphone, including an APP control table that contains installation package names and relevant states of all application programs preinstalled in the controlled smartphone, and categorizes each said application program as "activated" or "deactivated", wherein in an initial stage, icons of all the application programs are displayed in a desktop of the smartphone and all the installation package names in the APP control table are in the activated state;

Step 5, greying out the smartphone's HOME button, pressing and holding the smartphone's HOME button and Back button, and greying out the smartphone's status bar; and Step 6, configuring an authentication module in the ROM, and whitelisting the master APP for APP installation authentication, incoming/outgoing number authentication, and short text message authentication, which means that before an application program is to be installed in the smartphone, its package name is sent to the master APP for authentication, and only when it is authenticated by the master APP, the system allows the application program to be installed, and similarly, numbers of calls received or made by the smartphone are subject to the master APP's authentication, and only the number(s) authenticated by the master APP can be activated in the smartphone by means of ringing or an outgoing call, while the number(s) failing in said authentication is intercepted and logged in a call record of the smartphone; and when the smartphone receives an incoming short text message, the operating system, instead of inserting the short text message into its message database, produces a record for the master APP's authentication, wherein the record contains: related to the short text message, a sender's number, a recipient's number, a state mark indicating the receipt, and the short text message's content, and only when the short text message is authenticated by the master APP, it is inserted into the system's message database and renders a message icon into an unread state; otherwise, the master APP directs the system to discard this short text message, and when a short text message has been draft in the smartphone for sending out, upon a Send button is pressed, the system, instead of directly sending out the short text message, produces a record for the master APP's authentication, wherein the record contains: related to the short text message, a sender's number, a recipient's number, a state mark indicating the sending, and the short text message's content, and only when the short text message is authenticated by the master APP, the master APP directs the system to send out the short text message; otherwise, the master APP directs the system not to send out the short text message, and informing a user that this short text message is prevented from going out.

* * * * *